Dec. 6, 1938.                C. T. GALLOWAY                2,139,154
                            GEAR CUTTING MACHINE
                          Filed Dec. 28, 1936          4 Sheets-Sheet 1
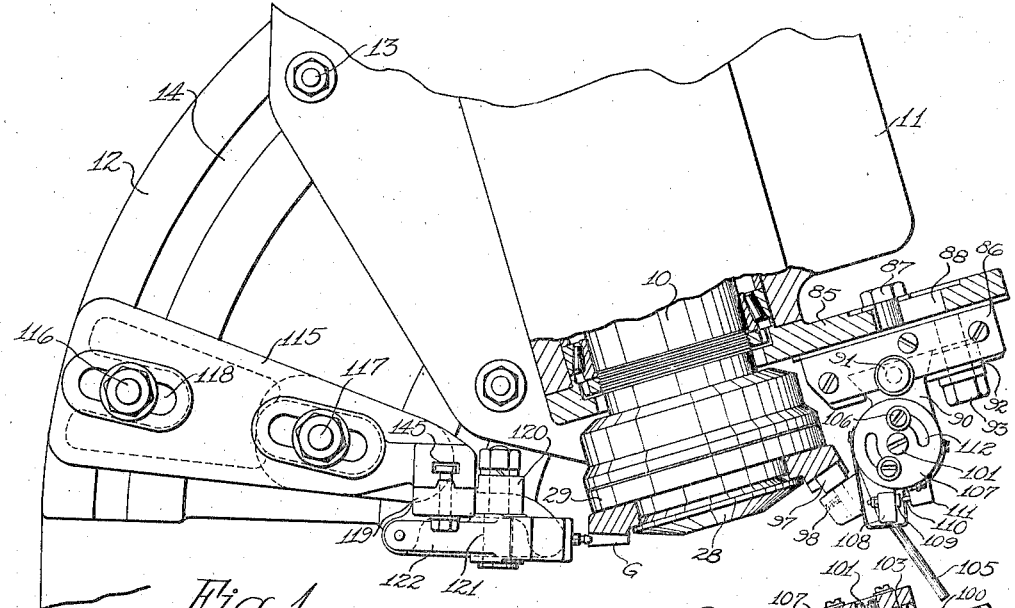
Fig. 1
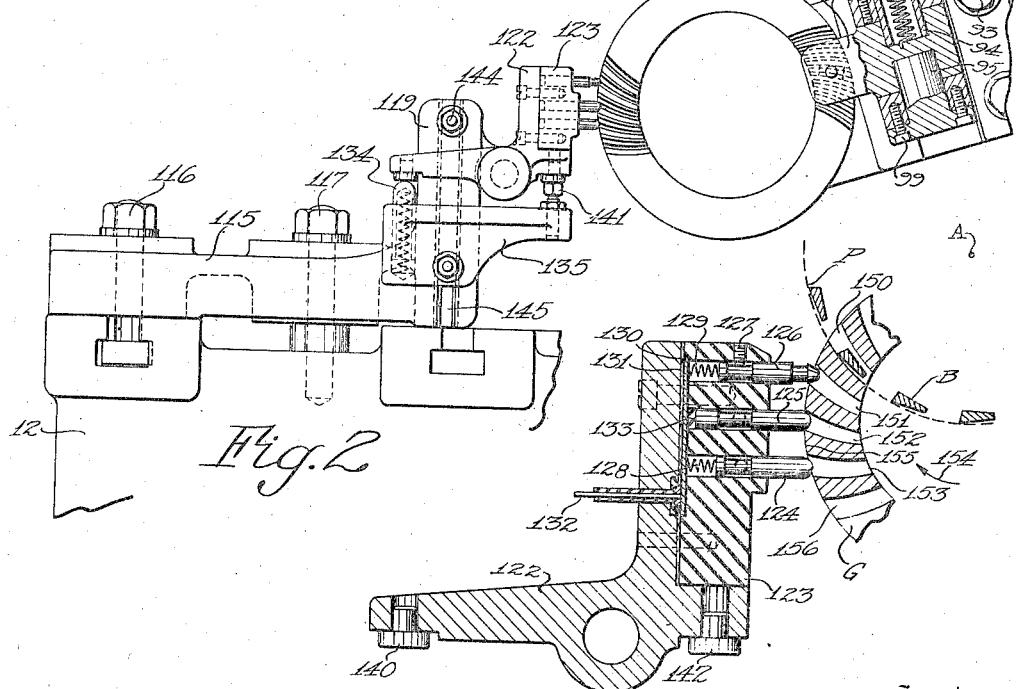
Fig. 2
Fig. 3
Inventor
Clarence T. Galloway
By
B. W. Schlesinger
Attorney Dec. 6, 1938.  C. T. GALLOWAY  2,139,154
GEAR CUTTING MACHINE
Filed Dec. 28, 1936  4 Sheets-Sheet 3

Inventor
Clarence T. Galloway.
By
B. Schlesinger
Attorney

Dec. 6, 1938.　　C. T. GALLOWAY　　2,139,154
GEAR CUTTING MACHINE
Filed Dec. 28, 1936　　4 Sheets-Sheet 4

Inventor
Clarence T. Galloway.
By
B. F. Shlesinger
Attorney

Patented Dec. 6, 1938

2,139,154

UNITED STATES PATENT OFFICE 2,139,154

GEAR CUTTING MACHINE

Clarence T. Galloway, Rochester, N. Y., assignor to Gleason Works, Rochester, N. Y., a corporation of New York Application December 28, 1936, Serial No. 117,694

18 Claims. (Cl. 90—2)

The present invention relates to machines for producing gears and particularly to machines for finish-cutting gears after their tooth spaces have been roughed out. In a still more specific aspect, the invention relates to machines of the type described in U. S. Patent No. 2,044,485 of June 16, 1936 for finish-cutting gears with a "single-cycle" cutter.

It not infrequently happens in shops where high production is the rule and where speed in manufacture and in handling is a prime consideration that through error now and then, a gear blank may not be turned down to the proper thickness, or a gear blank which has not been roughed out may be dropped in a bin intended to hold only roughed out gears, or the teeth in a blank may not be roughed out completely, or a roughed gear of one tooth number may be dropped into a bin intended for gears of another tooth number, etc. If any of these things occur, a blank reaches the finishing machine which is not suitable for finish-cutting on that machine and if through oversight, that blank is chucked on the finishing machine and an attempt is made to cut it, damage will result to the finishing cutter or to the finishing machine or to both.

There is still another possibility, the occurrence of which must be guarded against on any gear finishing machine but the prevention of which is most important in machines using "single-cycle" cutters, that is, improper angular positioning of the gear blank on the work spindle. In machines of the "single-cycle" type, a cutter is employed which is of face-mill form but which has its cutting blades arranged only part-way around its periphery with a gap between the last and first blades. The finish-cutting operation is effected by rotating the cutter continuously, holding the blank stationary while the blades of the cutter pass through a tooth slot of the blank, and indexing the blank when the gap in the cutter is abreast of the blank. The gap in the cutter is made as short as possible in order to get the highest possible efficiency out of the cutter. The indexing operation must, therefore, be timed very closely to the rotation of the cutter and the roughed blank must be positioned very accurately on the work spindle of the machine so that the blades of the cutter will enter tooth slots of the blank and not strike the teeth.

To position the roughed gear blank accurately, it is customary to use a stock dividing gauge which has a finger adapted to enter a tooth slot of the roughed blank. In order to insure correct gauging of the angular position of the blank, it is necessary to gauge the blank when the index mechanism of the machine is locked. It frequently happens, however, that when a machine is stopped after finishing a gear, the drive motor coasts sufficiently far to leave the index mechanism open when the machine actually stops. If a new gear blank is placed upon the spindle with the index mechanism, and stock is divided, the tooth spaces of this blank will be angularly displaced from the position which they should occupy and the result will be that when the machine is operated, the index mechanism will lock up with the gear in the wrong angular position on the work spindle and the blades of the cutter will strike a tooth of the blank and not enter a tooth slot. This will cause the blades of the cutter to be broken off or the cutter or machine otherwise to be damaged.

The purpose of the present invention is to provide means for safe-guarding gear finishing machines and particularly gear finishing machines of the "single-cycle" type against occurrences of the character above noted.

More specifically, one object of the invention is to provide means which will prevent starting of the finishing machine if the gear blank is not chucked properly or if the chucking mechanism is in dechucked or open position.

A further object of the invention is to provide means which will prevent the gear blank from being chucked unless the index mechanism of the machine is locked.

Another object of the invention is to provide means which will insure that stock-dividing of the roughed blanks is effected before the machine is started.

Still another object of the invention is to provide means which will constantly test the gear blank being cut to see that the roughed slots are properly spaced from one another, are roughed to the proper width and to the proper depth and which will act to stop the machine if any of these conditions are not satisfied.

Further objects of the invention will be apparent hereinafter from the specification and from the recital of the appended claims.

In the drawings:

Fig. 1 is a fragmentary plan view and Fig. 2 is a fragmentary side elevation of the work head and supporting base of a gear finishing machine of known construction and showing the stock dividing gauge and the tooth space tester of the present invention;

Fig. 3 is a sectional view on an enlarged scale of the tooth space tester and illustrating diagrammatically the relation of this tester, when in operative position, to the gear blank and to the finishing cutter;

Figure 4:
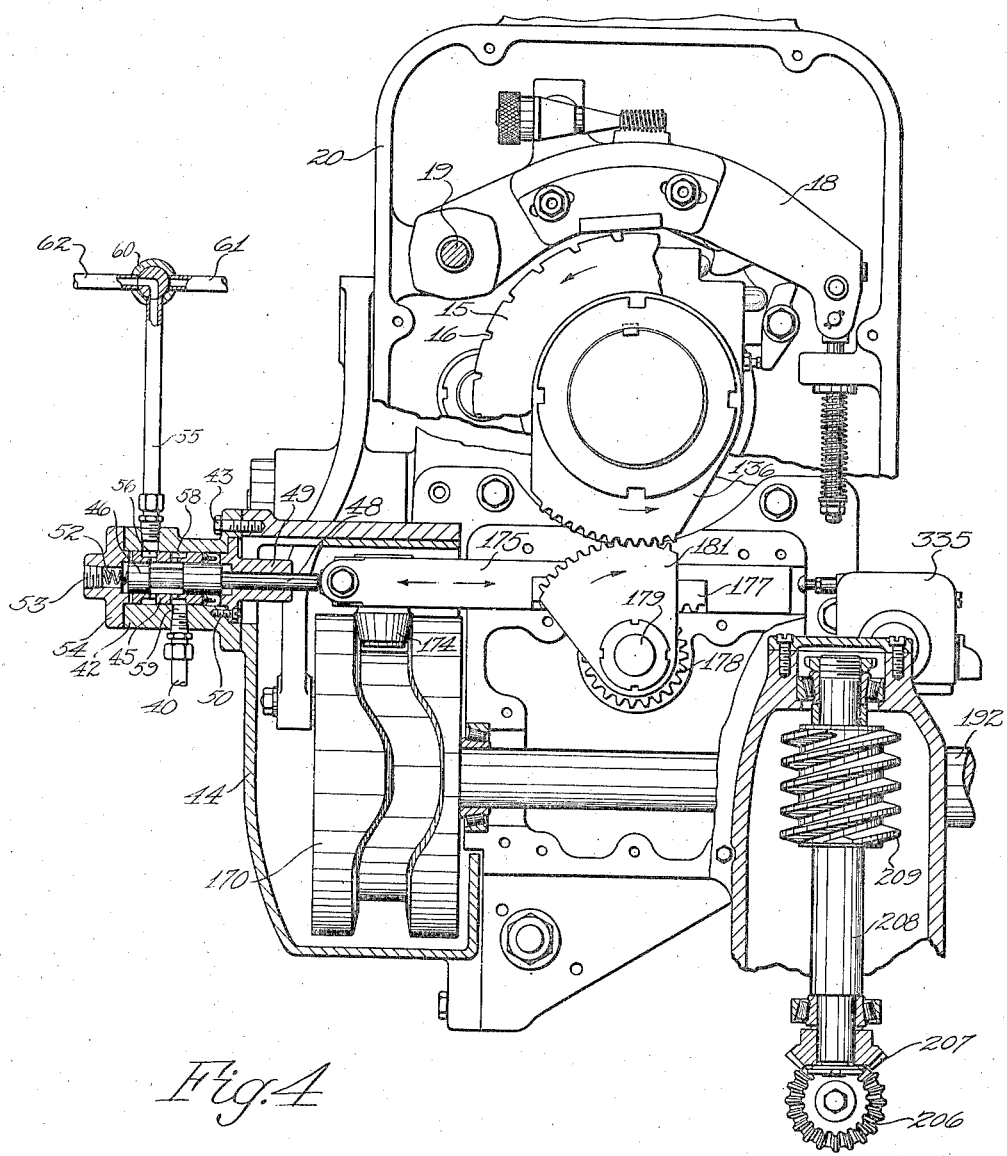
Fig. 4 is a view looking at the other end of the work head and showing the index mechanism of the machine and the valve provided under the present invention to insure that the index mechanism is locked up before the gear blank can be chucked.

The machine shown is of the type described in Patent No. 2,044,485 above mentioned but only those parts of that machine have been illustrated here which have been modified to provide the improvements of the present invention or whose illustration is required in order to explain the features and operation of the present invention. For a detailed description of the other parts of the machine and their operation, reference therefore may be had to the patent mentioned.

In the accompanying drawings, 10 denotes the work spindle. This spindle is suitably journaled in the work head 11, which is mounted for angular adjustment upon the supporting base 12 and which may be secured in any position of its angular adjustment by means of T-bolts 13 which engage in arcuate slots 14 formed in the upper face of the supporting base.

There is a notched index plate 15 keyed to the work spindle 10 at the rear end thereof. This index plate, as usual is provided with notches 16 equal in number to or a multiple of the number of teeth in the gear to be finished. The work spindle is locked against rotation during finish-cutting of the tooth spaces of the gear blank by the index-locking lever 18 which is pivotally mounted at 19 upon the guard or housing 20 which encloses the index mechanism.

The index mechanism shown is of exactly the same type as described in the patent above mentioned and will not be described in further detail here. It is sufficient to say that during cutting of a tooth space of a blank, the index mechanism is locked to hold the work spindle against rotation and that periodically, for the "single-cycle" type of machine, once in each revolution of the cutter, the index mechanism is unlocked and the work spindle rotated through a predetermined angle to index the blank. The means for operating the index mechanism is exactly the same as in the patent mentioned, namely, the bevel gears 206 and 207, shaft 208, worm 209, a worm wheel (not shown) which is secured to the shaft 192, the cam 170, roller 174, reciprocable bar 175, rack 177 which is secured to this bar, pinion 178 which meshes with this rack, shaft 179, segment 181, and segment 136 which is keyed to the work spindle. The reference numerals used are the same as those employed in describing the corresponding parts in the patent mentioned.

The work spindle 10 is bored to receive the draw-bar 25 of the chucking mechanism for the work head. The chucking mechanism shown in the accompanying drawings is hydraulically operated and therefore differs from the chucking mechanism illustrated in the patent mentioned, but it might be of the same type as that of the patent or of any other suitable type.

The draw-bar 25 is moved to chucking position by the coil-spring 26 which is interposed between a shoulder formed interiorly in the work spindle and a washer 27 which is secured to the end of the draw-bar. A clamping plate 28 is secured in any suitable manner to the forward end of the draw-bar and serves to clamp the gear blank G, which is to be finish-cut, on the work-arbor 29 when the draw-bar is in chucking position. The work arbor is mounted upon the work spindle in any usual or suitable manner.

The chucking mechanism is released by forward movement of the piston 30. This piston reciprocates in a cylinder formed in the casting 31 which is secured to the cover-plate of the housing 20 by screws 32. The cover-plate is secured to the housing 20 in any suitable manner.

The piston 30 is formed with a forwardly-extending cylindrical projection 34 which is guided and supported by the bearing member 35. This member is secured to the casting 31 by screws 36. The projection 34 of the piston 30 carries at its forward end a hardened piece 38 that engages the rear end of the draw-bar 25.

Fluid-pressure is applied to the rear end of the piston 30 to move the piston forward and effect release of the chucking mechanism. The motive fluid is supplied from the duct 40 which communicates with an opening formed in the rear wall of the casting 31. The duct 40 leads from a valve chamber 42 (Fig. 4) which is secured by screws 43 to the guard 44 which encloses the index cam 170.

The valve chamber 42 is bored to receive the sleeve 45 in which the valve 46 is reciprocably mounted.

The valve 46 is formed with a stem 48 at one end which projects through an opening in the end-plate 49 of the valve casing and engages the adjacent end of the bar 175. The end-plate 49 acts as a guide for the valve and is secured to the valve casing by screws 50. The valve stem is held in engagement with the bar 175 by a coil spring 52 which is interposed between the left-hand end of the valve and a plug 53 which is threaded into the outer end-plate 54 of the valve casing. This end-plate is secured to the valve casing by screws (not shown) or in any suitable manner. Thus, the valve stem 48 is held in engagement with the bar 175 so that the valve moves back and forth with the movement of the bar 175.

The motive fluid is supplied to and exhausted from the valve casing 42 by the duct 55. This duct communicates with the radial openings 56 formed in the valve sleeve 45. The valve sleeve is also formed with other radial openings 58 which communicate with the port 59 and this port 59 communicates with the duct 40.

In the position of the parts shown in Fig. 4, the index mechanism is locked-up by engagement of the index locking lever 18 with the index plate 15, and the valve 46 is held open, permitting of free flow of the motive fluid from the duct 40 through the duct 55 or vice versa. Hence, the blank can be chucked or dechucked at will.

The duct 55 is connected with a manually operable valve 60 which may be of any suitable construction and be mounted at any convenient point on the machine and which is connected by supply and exhaust lines 61 and 62, respectively, with the fluid pressure pump which supplies the system.

When the work spindle is being indexed, the bar 175 first moves to the right from the position shown in Fig. 4 to rock the segment 136 and unlock the index lever 18. During this rightward movement of the bar 175, the valve 46 also moves to the right under actuation of the spring 52 and finally shuts off the flow of fluid between the ducts 40 and 55. If the machine should stop with the valve in closed position, the work cannot be chucked because the line from the casting 31 back to the sump is closed.

By operation of this feature of the present invention, then, the index mechanism must be locked in order to chuck a gear blank. This feature, as will appear hereinafter, has a cognate advantage in connection with the stock dividing mechanism, for it insures that when the gear blank is chucked on the work spindle, the index mechanism is locked up and, since the stock is not divided until the gear blank has been chucked, that the gear blanks of a given tooth number will all be chucked in the same angular relation on the work spindle.

Figure 5:
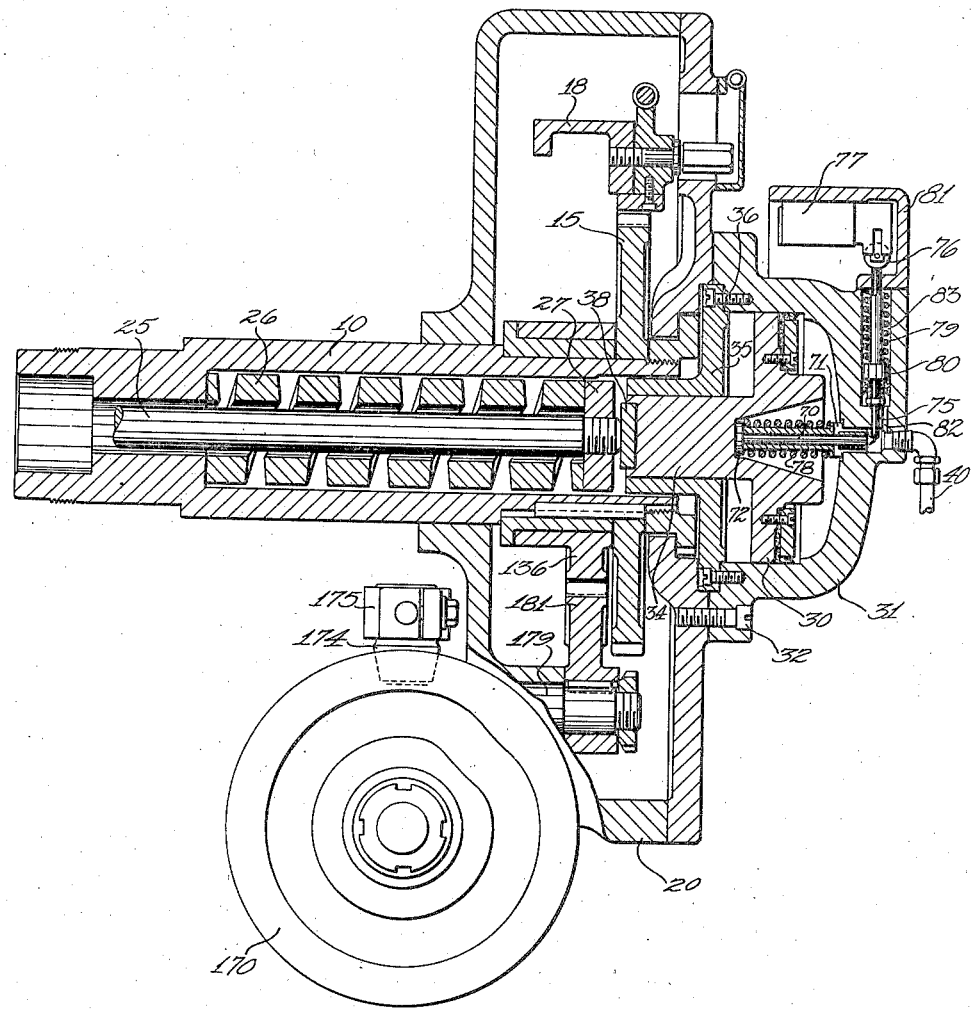
Fig. 5 is a longitudinal sectional view of the work head, showing among other things, the limit switch which assures that the blank is properly chucked before the machine is started.

Incorporated in the present invention also is means for preventing starting of the machine if the chucking mechanism is in dechucked position, or if the blank which has been chucked is too thin, or if the clamping disc 28 is left off and the blank has not been securely chucked. This comprises a plunger 70 which slides in a guide or sleeve 71 (Fig. 5). This sleeve or guide is mounted in the casting 31 in alignment with the draw-bar 25. The plunger has an enlarged head 72 at one end which engages the piston 30 and at its other end it is formed with a conical nose which engages the conical nose of a plunger 75 which is mounted in the casting 31 to move at right angles to the direction of movement of the plunger 70.

The plunger 75 engages at its outer end the roller 76 of a limit-switch 77. This limit-switch is incorporated in the starting circuit of the machine. It is a normally closed switch and unless it is closed, the machine cannot be started.

The plunger 70 is held in engagement with the piston 30 by a coil-spring 78 which surrounds the sleeve 71 and engages the head 72 of the plunger. The plunger 75 is held in engagement with the plunger 70 by a coil-spring 79 which surrounds the plunger 75 and is interposed between the collar 80 formed on this plunger and the adjacent side wall of the bracket 81 in which the limit-switch 77 is mounted.

A duct 82 in the casting 31 serves to conduct fluid from the duct 40 to the lower side of the collar 80 of the plunger 75 when the motive fluid is being supplied to the chuck-releasing piston 30. The collar 80 has a substantially fluid tight fit with the walls of the bore 83 in which the plunger slides. Hence, when the chuck is in dechucked or open position, the switch 77 is opened and the machine cannot be started.

On the other hand, if the roughed gear blank which is to be finish-cut is too thin or if the clamping disc 28 is left off in the chucking of a blank, the draw-bar 25 and piston 30 will move too far over to the right from the position shown in Fig. 5 and the plunger 70 will be moved to the right against the resistance of the spring 78 causing the plunger 75 to be moved outwardly against the resistance of the spring 79. This again will open the switch 77 preventing the machine from being started.

The stock dividing mechanism of the machine is mounted upon a holder 85 (Fig. 1) which is mounted for rotatable adjustment about the axis of the work spindle 10 and is secured in any adjusted position to the work head 11. There is a slide 86 mounted on this holder 85 for adjustment radially of the work spindle axis and the slide can be secured in any position on the holder 85 by the bolt 87 which passes through the elongated slot 88 provided in the arm. Mounted on the slide 86 is a support 90 which is slidably adjustable on the slide 86 in a direction at right angles to the direction of adjustment of the slide itself on the holder 85. Adjustment of the support 90 upon the slide 86 is effected by a screw which can be manipulated by the knob 91 in the usual manner. The support 90 has a dove-tailed engagement with the slide 86 and is secured in any adjusted position by the gib 92 and bolts 93.

The various adjustments described permit of positioning the stock-dividing gauge with reference to different roughed gears to accurately gauge the same.

The support 90 carries the trunnion bearings 94 and 95 on which the arm 96 is journaled. The bearings are secured to the support 90 by screws 99. The stock-dividing finger 97 is carried by the arm 96, being held in place by the set-screw 98.

In Figs. 1 and 2, the stock-dividing gauge is shown in operative position with the finger 97 engaged in a tooth slot of the gear blank G which is to be finish-cut. The finger 97 is normally held in inoperative position by the coil-spring 100, one end of which is fixed to the arm 96 and the other end of which is engaged in the nipple 101. This nipple is rotatably mounted in a plate 102 which is secured to the trunnion bearing 94 by screws 103. The nipple is slotted at its outer end so that a screw driver or other suitable tool can be used to rotate the nipple to adjust the tension of the spring 100. There is a handle 105 secured to the arm 96 and through use of this handle, the arm 96 can be rotated to move the finger 97 into engagement with the gear blank.

Secured to the disc 102 by the screws 106 is a plate 107. There is an arm 108 formed integral with this disc and this arm carries an electrical contact point 109 that is adapted to engage a contact point 110 which is carried on the arm 111 which is integral with the disc 102. The screws 106 extend through arcuate slots 112 in the plate 107 and these slots permit of angular adjustment of the plate 107 on the disc 102 so that the terminals 109 and 110 can be adjusted so that they will contact one another when the finger 97 is engaged in a tooth slot of the roughed gear blank which is to be finish-cut.

The terminal 109 is wired, as will hereinafter be explained more fully, in the electrical circuit of the machine so that until after a circuit is made through the contact points 110 and 109, the machine cannot be started. The purpose and result of this is to insure that stock is divided, that is, that the gear is positioned correctly angularly on the work spindle before the machine is started.

As a further safety feature, the present invention provides a means for continuously testing the gear blank which is being finish-cut to see that the tooth slots of this blank have been correctly roughed out. This part of the invention will now be described.

Mounted upon the supporting base 12 is a bracket 115. The bracket 115 is secured to the supporting base by bolts 116 and 117. The bolt 116 passes through an elongated slot 118 in the bracket and engages in one of the arcuate slots 14 of the supporting base. The bolt 117 threads directly into the supporting base.

The bracket 115 carries the slide 119. There is an ear 120 formed integral with this slide.

Pivotally mounted on this ear by means of the pin 121 is a holder 122 which has the form of a bell-crank lever. There is a fibre block 123 secured to one arm of this bell-crank member 122. This block has three openings which receive the pins 124, 125 and 126, respectively. Each of these pins is secured in the block against rotary or longitudinal movement by a set-screw 127.

The pins 124 and 126 are connected by electric wires 128 and 129, respectively with a metal plate 130 which is insulated from the lever arm 124 by the insulating strip 131. An insulated electric wire 132 is connected to the back of the plate 130.

The pins 124, 125 and 126 are spaced apart so that they will enter, respectively, successive tooth slots of the gear blank being finish-cut, as shown clearly in Fig. 3. The pin 125 is insulated by the pad 133 from the plate 130.

The pins 124 and 126 are made of such dimension at the ends which project into the tooth spaces of the roughed gear that if these tooth spaces have been made of proper size, the pins will not contact with the sides or bottoms of the tooth spaces. If the tooth spaces roughed out in the gear in the roughing operation are not of proper dimension, however, then the pins 124 and 126 will contact with the sides of the tooth spaces and cause a short circuit to be made through the gear blank G itself, which is made of metal, and stop the machine.

The pin 125 has a ratcheting engagement with the tooth spaces of the gear blank and as the blank is indexed about its axis in successive indexing operations, the pin 125 is moved out of one tooth space of the blank and travels on the outer end face of the adjacent tooth of the blank until it drops into the next tooth space. In its movement, of course, the pin 125 rocks the carrier 122, swinging the pins 126 and 124 clear of the tooth spaces of the blank at the time of indexing and allowing them to drop into the next succeeding tooth spaces, respectively, of the blank after the indexing operation is completed.

The carrier 122 is held resiliently in operative position by the spring-pressed plunger 134. This plunger is housed in an arm 135 which is integral with the bracket 119. The plunger engages a hardened button 140 which is secured in one arm of the carrier 122.

Movement of the carrier 122 in a clockwise direction about the pivot 121 is limited by an adjustable stop 141 which is threaded in the arm 135 and which engages a hardened button 142 that is carried by the carrier 122.

The bracket 119 is adjustable vertically on the bracket 115 and is secured in any adjusted position by T-bolts 144 which engage in the longitudinal T-slot 145 which is formed in the enlarged inner end of the bracket 115. This adjustment together with the lateral adjustment of the bracket 115 on the supporting base 12 made possible by the longitudinal slots 118 permits of positioning the tooth space detector or tester in correct operative relation to the gear blank to be finish cut.

In Fig. 3, I have illustrated diagrammatically the relation of the tooth space detector to the cutter which is used for finish cutting the gear blank, here indicated as a face-mill gear cutter having a plurality of cutting blades B which travel in the circular path P as the cutter rotates on its axis A.

In the drawings, the cutter is indicated as operating in the tooth space 150 of the gear blank G, the pin 126 is shown as projecting into the next adjacent tooth space 151, the pin 125 engages in the next adjacent tooth space 152 and the pin 124 projects into the next tooth space 153. After the cutter has finish-cut the sides of the tooth space 150, the gear blank G is indexed by the index mechanism of the machine. The indexing mechanism is so arranged as to rotate the blank in the direction of the arrow 154. Thus, the pin 125 is ratcheted out of the tooth space 152, swinging the carrier 122 about its pivot 121 and withdrawing the pins 126 and 124 from the tooth spaces 151 and 153. The pin 125 travels on the end of the tooth 155 during the indexing operation, holding the pins 126 and 124 out of engagement with the blank and at the end of the indexing operation, it drops into the tooth space 153, permitting the pins 126 and 124 to project into the tooth spaces 152 and 156, respectively.

The lower pin 124 determines whether the tooth slots have been roughed out in the gear blank and whether the tooth slots are in correct spaced relation from one another. Thus, if no tooth slot had been roughed out in the gear blank at 156, then the pin 124 would strike solid metal in the gear blank at the end of the indexing operation. This would immediately cause a short circuit in the machine through the pin 124 and the gear blank and would stop the machine as will hereinafter be more particularly described. Likewise, if the roughed gear were of a different pitch, that is, of a different tooth number from the gear which it is intended to finish on the machine, the tooth space 156 would be displaced from the tooth space 153 at an angle such that the pin 124 would engage with a side of the tooth space or with the end of a tooth of the gear and in either case short circuit the machine, stopping it.

The upper pin 126 determines whether the tooth slots of the roughed gear blank have been roughed to proper width and proper depth, for the width of tooth space is related directly to the depth of tooth space in any gear in which the sides of the teeth are of positive pressure angle. The upper pin 126 alone could not determine whether the tooth slots were roughed out or not, because if the pin 124 were omitted, and the gear blank happened to have a tooth slot roughed out in the wrong position or a tooth slot omitted, then the rider pin 125 would simply ride on the blank and the pin 126 would not come into engagement with the blank and there would be no short circuiting and the tooth space detector would not function to stop the machine. The rider pin 125 would simply act to hold the pin 126 out of engagement with the blank. The upper pin 126 clears away quickly as the holder 122 swings about its axis 121 in the indexing operation and therefore the upper pin 126 can be set accurately to gauge the width of the tooth spaces of the gear blank. To make it easier for this pin to clear, it is preferably made with a conical head as shown.

If the upper pin 126 were omitted and an effort were made to gauge the width of the tooth slots of the gear blank as well as the presence of these slots with the pin 124 alone, the gauging of the width of the tooth slots would not be close enough. The lower pin 124 would have to be set so accurately that if there were a slight extra amount of stock left on the sides of a tooth space in the roughing operation, the pin 124 would be likely to jam into the sides of the tooth space as the holder 122 swung about its axis 121 in the indexing operation. It is desirable, therefore, to employ the three pins, 126, 125 and 124 in the tooth space detector.

Figure 6:
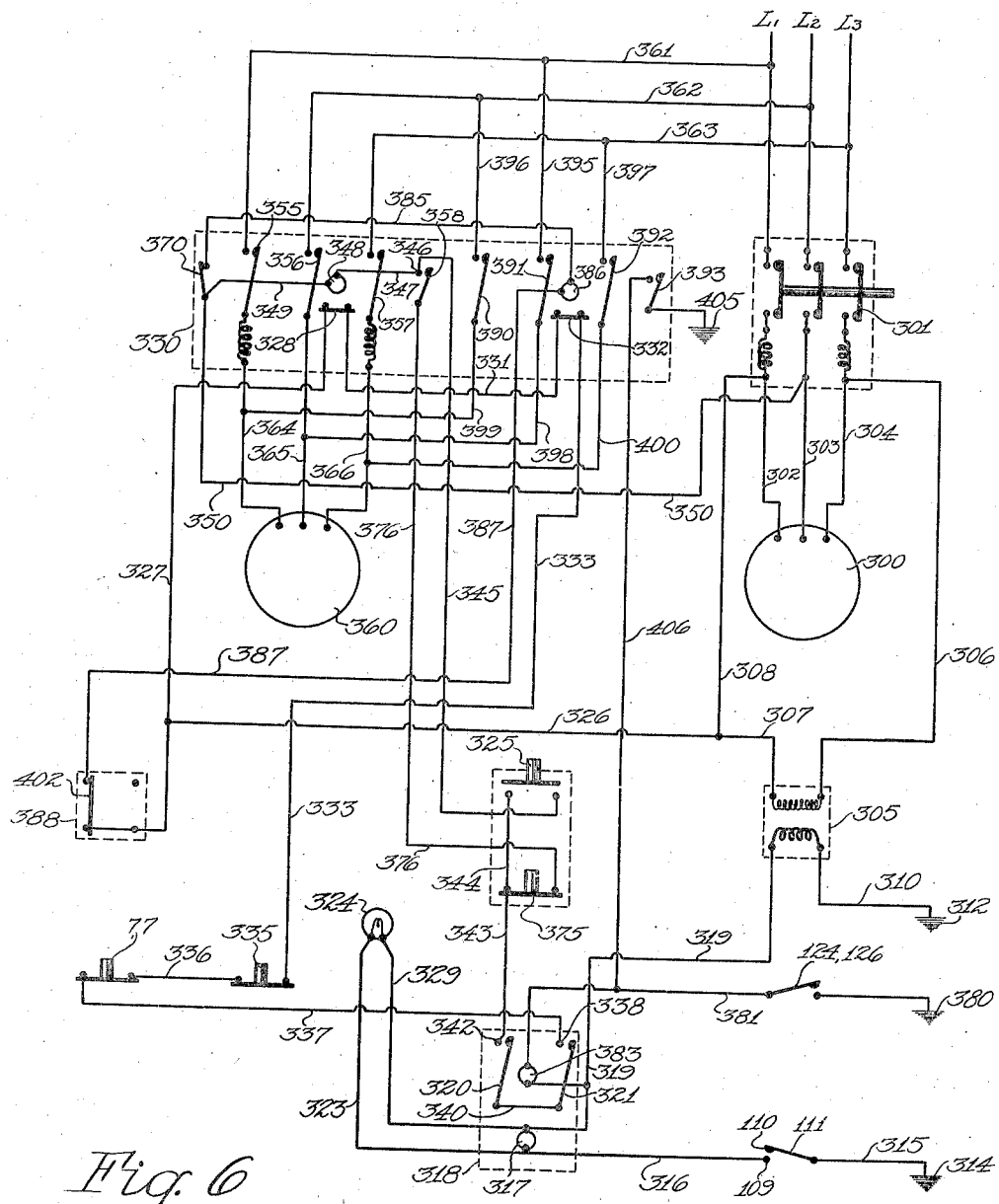
Fig. 6 is an electrical wiring diagram of the machine.

One way in which the machine may be wired to effect the purposes of the present invention is illustrated diagrammatically in Fig. 6. L¹, L² and L³ denote the main lines. To start the machine, the motor which drives the fluid pressure pump must be started first. This is a safety feature in itself, insuring that the fluid pressure pump is in operation before any actual cutting can begin. The motor which drives the fluid pressure pump is designated at 300. It is started by pressing the manually operated button 301 which closes a circuit from the main lines L¹, L² and L₃ through the lines 302, 303 and 304 to the motor 300.

Before the machine can be started, it is also necessary to divide stock, that is, to engage the finger 97 of the stock dividing gauge in a tooth space of the gear blank so as to properly locate this blank angularly on the work spindle of the machine so that the cutter will pass into the tooth slots of the roughed blank and not strike solid metal. Precise stock dividing is insured because the finger 97 must be engaged in a tooth space of the gear blank far enough for the terminals 109 and 110 to engage one another before the main drive motor of the machine can be started.

There is a transformer 305 provided on the machine. This transformer is connected by the line 306 with the line 304 and is connected by the lines 307 and 308 with the line 302. The transformer is grounded to the machine at any suitable point by the line 310, the ground connection being denoted at 312.

When the stock-dividing finger 97 is engaged in a tooth space of the blank, a circuit will be made from a suitable ground connection 314 on the machine through the line 315, the arm 111, contacts points 110 and 109, line 316, electro-magnet 317 of a relay 318, line 323, signal-lamp 324, line 329 and line 319. The lamp 324 is provided so that the operator may have a visual indication that stock has been divided properly.

Thus, the electro-magnet 317 forming part of the relay 318 is energized and will close the switch arms 320 and 321. The relay is of standard type and when the switch arms are closed, they are held closed by a mechanical lock until a second electro-magnet 383 is energized to withdraw this lock from operative position, allowing the arms 320 and 321 to drop out of operative position.

After the switch blades 320 and 321 have been closed, the operator can start the machine by pressing the start button 325, which may be located at any suitable position on the machine. When this start button is pushed in, a circuit is completed from the line 302 through the line 308, line 326, line 327, overload relay 328 of a controller 330 of suitable construction, line 331, overload relay 332, line 333, the switch of an automatic stop device 335 of any suitable construction such as is ordinarily provided on gear cutting machines, line 336, limit-switch 77 (Fig. 5) of the chucking mechanism, line 337, terminal 338, switch blade 321, line 340, switch blade 320, terminal 342, lines 343 and 344, start-button 325, line 345, terminal 346 of controller 330, line 347, electro-magnet 348, and lines 349 and 350 to the line 303.

This energizes the electro-magnet 348 closing the switch arms 355, 356, 357 and 358 of the controller 330. The switch arms 355, 356 and 357 then connect the main lines L¹, L² and L³ with the motor 360, which drives the cutter, through the lines 361, 362, 363, and the lines 364, 365 and 366. From the above it will be noted that in order to start the machine, the limit-switch 77 must be closed, that is, the gear blank must be properly chucked.

The switch-arm 370 is connected to the switch-arms 355, 356, 357 and 358 so that when these arms are closed, the arm 370 is opened and vice versa.

The start button 325 is a normally open button and when the operator releases it, it flies open. The circuit to the cutter drive motor 360 is maintained, however, until the automatic stop mechanism of the machine functions, through the stop button 375, which is a normally closed button. The circuit is from this button through the line 376, switch arm 358, line 347, electro-magnet 348, line 349, and line 350 to the line 303 and from the button 375 through the line 343, terminal 342, blade arm 320, line 340, blade arm 321, line 337, limit-switch 77, line 336, automatic stop 335, line 333, overload relay 332, line 331, overload relay 328, lines 327, 326 and 308 to line 302.

If the blank has not been roughed out properly or the roughed out tooth spaces are not of the proper width, the tooth space detector or tester will contact the gear, as already described, and complete a circuit through the gear. The gear blank is the ground of this circuit and is denoted diagrammatically at 380 in Fig. 6. When the detector pin 124 or the detector pin 126 makes contact, then, the circuit is completed from the gear blank, as a ground 380, through the pin 124 or 126, the line 381, the electro-magnet 383, the line 319, transformer 305, line 310 to the ground 312. This energizes the electro-magnet 383 to cause the mechanical locking member of the relay 318 to be disengaged, allowing the switch blades, 320 and 321 to drop out of engagement with the terminals 342 and 338, respectively, and break the circuit to the electro-magnet 348. This causes the switch arms 355, 356, 357 and 358 to be disengaged and break the circuit to the cutter drive motor 360.

When the switch arms, 355, 356, 357 and 358 drop out of engagement, however, the switch arm 370 is pulled into operative position and a circuit is completed from the line 303 through the line 350, switch arm 370, line 385, electro-magnet 386, line 387, plugger relay 388, lines 326 and 308 to line 302. This energizes the electro-magnet 386 of the controller 330, causing the switch arms 390, 391, 392 and 393 to be closed. The closing of the switch arms 390, 391 and 392 causes the cutter drive motor 360 to be reversed, the connection being from the main lines, L¹, L² and L³ through the lines 361, 362 and 363, respectively, the lines 395, 396 and 397, respectively, the switch arms 391, 390 and 392, respectively, the lines 398, 399 and 400, respectively, and the lines 365, 364 and 366, respectively.

The plugger relay 388 is of standard construction and operates by friction from the armature shaft of the motor 360 and the friction is such that after the motor has revolved in the reverse direction through a predetermined angle, the contact bar 402 of the plugger relay will be opened, breaking the circuit to the electro-magnet 386 and allowing the switch arms 390, 391 and 392 to drop out of operative position. This stops the cutter drive motor 360. The purpose of reversing the cutter drive motor is to help effect quick stopping of the same.

From the above description, it will be seen that if the tooth space detector functions, the machine will be stopped; also that before the machine can be started again, stock must be divided.

If all of the tooth spaces in the gear blank being finish-cut have been roughed out properly, the tooth space detector does not operate and the machine continues in operation until all of the teeth of the gear have been cut. Then the automatic stop device functions in the usual manner, the switch 335 is opened and circuit to the electro-magnet 348 is broken stopping forward rotation of the cutter drive motor 360. The reverse drive is tripped in through the electro-magnet 386 in exactly the same manner as described above and the plugger-relay 388 functions to stop the motor exactly as described above.

It will be noted that when the switch arm 393 is closed when the electro-magnet 386 is energized, a circuit is made from a ground connection denoted at 405 through the line 406 to the electro-magnet 383, energizing this magnet to withdraw the locking member which acts to hold the switch arms 320 and 321 closed. These arms will drop out of engagement with the terminals 342 and 338 and thus all the parts will be returned to starting position.

While the invention has been described in connection with a particular application thereof, it will be obvious that it is capable of wide use and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for finishing previously roughed gears, a rotary work support, tool mechanism, means for rotating the work support to bring the tooth spaces of the work successively into engagement with the tool mechanism, and means for testing the work to determine whether the tooth spaces of a gear have been properly roughed out before they are rotated into engagement with the tool mechanism, said means being operable to stop the machine if the test is negative.

2. In a machine for finishing a previously roughed gear, a rotary work spindle, tool mechanism, means for actuating the tool mechanism, means for gauging the angular position of the work on the work spindle, means normally preventing operation of the actuating means, and means operated by movement of the gauging means into gauging position to render the actuating means operative.

3. In a machine for finishing a previously roughed gear, a rotary work spindle, tool mechanism, means for gauging the angular position of the work on the work spindle, indexing mechanism for the work spindle, and means preventing starting of the machine unless the index mechanism is locked.

4. In a machine for producing gears, a rotary work spindle, tool mechanism, means for actuating the same, indexing mechanism for the work spindle, chucking mechanism for the work, means for preventing starting of the tool actuating means until the work is chucked, and means for preventing chucking of the work unless the index mechanism is locked.

5. In a machine for finishing a previously roughed gear, a rotary work spindle, tool mechanism, means for actuating the tool mechanism, chucking mechanism for the work, indexing mechanism for the work spindle, means preventing starting of the tool actuating means until the work is chucked, means preventing chucking of the work unless the index mechanism is locked, means for gauging the angular position of the work on the work spindle, and means preventing starting of the tool actuating means until after the gauging means has been operated to gauge the angular position of the work.

6. In a machine for producing gears, a rotary work spindle, tool mechanism, means for actuating the tool mechanism, indexing mechanism for the work spindle, and means for preventing starting of said actuating means unless the indexing mechanism is locked.

7. In a machine for finishing a previously roughed gear, a rotary work spindle, tool mechanism, means including an electric motor for actuating the tool mechanism, means for gauging the angular position of the work upon the work spindle, a normally open switch in the starting circuit of said motor, and means carried by said gauging means for closing said switch when said gauging means is operated.

8. In a machine for finishing a previously roughed gear, a rotary work spindle, tool mechanism, means including an electric motor for actuating the tool mechanism, indexing mechanism for the work spindle, means for gauging the angular position of the work on the work spindle, means requiring gauging of the work to start said electric motor, and means preventing starting of said motor unless the index mechanism is locked up.

9. In a machine for finishing a previously roughed gear, a rotary work spindle, tool mechanism, means including an electric motor for actuating the tool mechanism, chucking mechanism for the work, means preventing starting of the motor until the work is chucked, means for gauging the angular position of the work on the work spindle, and means preventing starting of the motor until the work has been gauged.

10. In a machine for finishing a previously roughed gear, a rotary work spindle, tool mechanism, means including an electric motor for actuating the tool mechanism, chucking mechanism for the work, indexing mechanism for the work spindle, means preventing operation of the chucking mechanism if the index mechanism is not locked up, means preventing starting of the motor until the work is chucked, means for gauging the angular position of the work on the work spindle, and means preventing starting of the motor until the work has been gauged.

11. In a machine for finishing a previously roughed gear, a rotary work spindle, means for rotating the work spindle, tool mechanism, means including an electric motor for actuating the tool mechanism, chucking mechanism for the work, means preventing starting of the motor until the work is chucked, means for testing the work as it is rotated toward the tool mechanism to determine whether successive tooth spaces of the work have been properly roughed out, and means operated by the testing means for stopping the motor if the test is negative.

12. In a machine for finishing a previously roughed gear, a rotary work spindle, tool mechanism, means including an electric motor for actuating the tool mechanism, indexing mechanism for the work spindle, means preventing starting of the machine until the index mechanism is locked up, means for testing successive tooth spaces of the work as it is rotated toward the tool mechanism in successive indexing operations to determine whether the tooth spaces have been properly roughed out, and means operated by the testing means for stopping the motor if the test is negative.

13. In a machine for finishing a previously roughed gear, a rotary work spindle, means for rotating the work spindle, tool mechanism, means including an electric motor for actuating the tool mechanism, means for gauging the angular position of the work on the work spindle, means preventing starting of the motor until the work has been gauged, means for testing successive tooth spaces of the work, as it is rotated toward the tool mechanism, to determine whether said tooth spaces have been properly roughed out, and means operated by the testing means for stopping the motor if the test is negative.

14. In a machine for producing gears, a work spindle, chucking mechanism for the work, indexing mechanism for the work spindle, and means preventing chucking of the work unless the index mechanism is locked up.

15. In a machine for finishing a previously roughed gear, a work spindle, means engageable with a tooth slot of the work to test the angular position of the work on the work spindle, and means for testing successive slots of the work to determine whether they are properly spaced and roughed and means operatively connected to each of the two first named means to prevent operation of the machine in event either test is negative.

16. In a machine for producing gears, a work spindle, chucking mechanism for securing a workpiece to the work spindle comprising a draw-bar movable axially in the work spindle to and from chucking position, and means for insuring that if the draw-bar is moved in either direction beyond the axial position suitable for chucking a gear blank of suitable dimension, the machine cannot be started.

17. In a machine for producing gears, a work spindle, chucking mechanism for securing a workpiece to the work spindle comprising a draw-bar which is movable axially of the work spindle, means including a limit switch for controlling the operation of the machine, and means operatively connecting the draw-bar and the limit-switch so that if the draw-bar is moved in either direction beyond a predetermined axial position, the limit-switch is opened.

18. The combination in a machine for finishing previously roughed gears, of a rotary work support, a tool for finishing the tooth surfaces of a previously roughed gear, means for rotating the work support to bring the tooth spaces of the work successively into engagement with the tool, and means mounted in operative relation with the work and operable automatically in time with the rotating means to test successively each tooth space of the gear before it is rotated into engagement with the tool.

CLARENCE T. GALLOWAY.